(12) United States Patent
Saxena et al.

(10) Patent No.: US 12,491,692 B2
(45) Date of Patent: Dec. 9, 2025

(54) MANUFACTURING OPTICAL ELEMENTS

(71) Applicant: HEPTAGON PHOTONICS PTE. LTD., SINGAPORE, SG, Singapore (SG)

(72) Inventors: Abhishek Saxena, Zurich (CH); Elena Iseni, Zurich (CH)

(73) Assignee: HEPTAGON PHOTONICS PTE. LTD., Singapore (SG)

( * ) Notice: Subject to any disclaimer, the term of this patent is extended or adjusted under 35 U.S.C. 154(b) by 8 days.

(21) Appl. No.: 18/257,298

(22) PCT Filed: Dec. 6, 2021

(86) PCT No.: PCT/SG2021/050752
§ 371 (c)(1),
(2) Date: Jun. 14, 2023

(87) PCT Pub. No.: WO2022/132038
PCT Pub. Date: Jun. 23, 2022

(65) Prior Publication Data
US 2024/0042710 A1   Feb. 8, 2024

(30) Foreign Application Priority Data
Dec. 15, 2020   (GB) ...................... 2019796

(51) Int. Cl.
*B29D 11/00* (2006.01)
(52) U.S. Cl.
CPC .... *B29D 11/00365* (2013.01); *B29D 11/0048* (2013.01)
(58) Field of Classification Search
CPC ................ B29D 11/00365; B29D 11/0048
See application file for complete search history.

(56) References Cited

U.S. PATENT DOCUMENTS

| 4,197,266 A | 4/1980 | Clark et al. |
| 4,640,489 A | 2/1987 | Larsen |

(Continued)

FOREIGN PATENT DOCUMENTS

| AU | 199994015599 A1 | 9/1999 |
| EP | 0686489 A2 | 12/1995 |

(Continued)

OTHER PUBLICATIONS

International Search Report issued for the corresponding PCT patent application No. PCT/SG2021/050752, dated Mar. 4, 2022, 4 pages (For informational purposes only).

(Continued)

*Primary Examiner* — Mathieu D Vargot
(74) *Attorney, Agent, or Firm* — Viering, Jentschura & Partner mbB

(57) ABSTRACT

A method for manufacturing an optical element such as a micro-optic lens may include providing a substrate having a surface profile, the substrate surface profile defining one or more flow stop features. The method may include providing a mold tool having a mold surface profile and dispensing viscous material. When the mold surface profile and the substrate surface profile are disposed towards one another and aligned relative to one another, the mold surface profile and the substrate surface profile define therebetween an optical element cavity, a peripheral cavity disposed around a periphery of the optical element cavity where the peripheral cavity includes one or more flow stop features, and an air flow path for air to flow in and out of the peripheral cavity from and to an external environment. The optical element cavity and the peripheral cavity define a peripheral constriction therebetween.

20 Claims, 3 Drawing Sheets

(56) References Cited

U.S. PATENT DOCUMENTS

| | | | |
|---|---|---|---|
| 6,129,866 A | 10/2000 | Hamanaka et al. | |
| 8,303,866 B2 * | 11/2012 | Delaney ........... | B29D 11/00365 |
| | | | 264/1.32 |
| 2002/0145211 A1 | 10/2002 | Pegram et al. | |
| 2005/0093186 A1 | 5/2005 | Nystrom et al. | |
| 2007/0216048 A1 | 9/2007 | Rudmann et al. | |
| 2016/0216493 A1 | 7/2016 | Wan et al. | |
| 2016/0313540 A1 | 10/2016 | Kao et al. | |

FOREIGN PATENT DOCUMENTS

| | | | |
|---|---|---|---|
| EP | 0799689 | A2 | 10/1997 |
| EP | 0911144 | A2 | 4/1999 |
| JP | 5243403 | B2 | 7/2013 |
| KR | 1020090065193 | A | 6/2009 |
| KR | 1020100068633 | A | 6/2010 |
| TW | I625541 | B | 6/2018 |

OTHER PUBLICATIONS

British Search Report of corresponding British Patent Application 2019796.8, dated Jun. 9, 2021, 2 pages (for informational purposes).

* cited by examiner

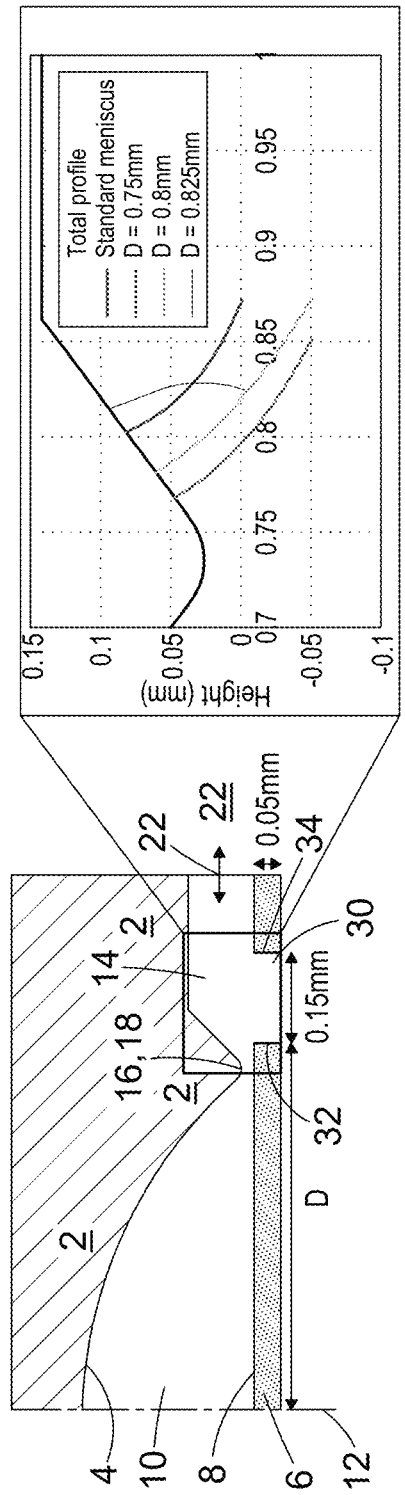
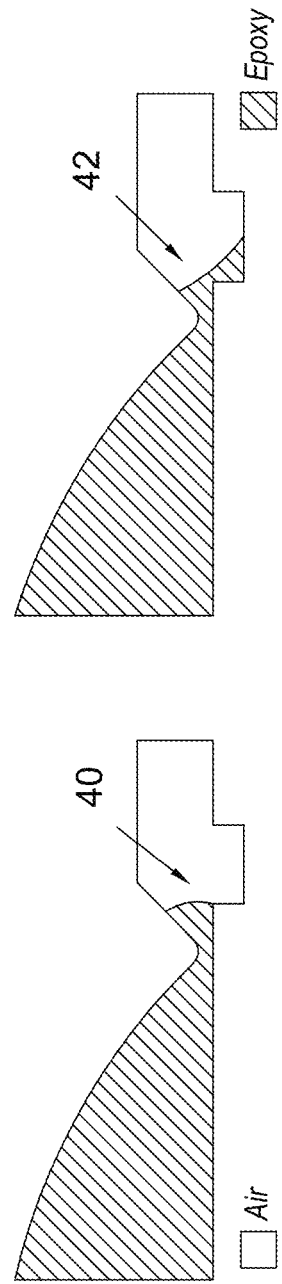
FIG. 1A
FIG. 1B
FIG. 1C
FIG. 1D

MANUFACTURING OPTICAL ELEMENTS

CROSS-REFERENCE TO RELATED APPLICATIONS

The present application is a national stage entry according to 35 U.S.C. § 371 of PCT application No.: PCT/SG2021/050752 filed on Dec. 6, 2021; which claims priority to British patent application 2019796.8, filed on Dec. 15, 2020; all of which are incorporated herein by reference in their entirety and for all purposes.

TECHNICAL FIELD

The present disclosure relates to a method for use in manufacturing an optical element such as a micro-optic lens and in particular, though not exclusively, to a method for use in manufacturing a plurality of optical elements such as an array of micro-optic lenses on a wafer.

BACKGROUND

It is known to use a molding process to manufacture a micro-optic lens in which a mold surface profile of a mold tool is used to mold a viscous material such as a viscous epoxy and thereby impart a desired lens profile to the viscous material. Once molded, the viscous material is hardened, for example cured and/or heated, to form the micro-optic lens. One of ordinary skill in the art will understand that such molding processes may be performed at wafer level to manufacture an array of micro-optic lenses simultaneously. Once manufactured, the array of micro-optic lenses is separated or diced to form a plurality of individual micro-optic lens components. It is desirable to maximise the yield of such wafer-level processes not only by maximising the proportion of micro-optic lenses which are compliant with a desired lens profile specification, but also by reducing the footprint of each micro-optic lens so as to maximise the number of compliant micro-optic lenses obtained for a given wafer area. Reducing the footprint also means that the micro-optic lens can be used in a smaller sized package, for example as a single micro-optic lens or as part of a stack of micro-optic lenses.

In one such wafer-level optical element manufacturing process, liquid epoxy is dispensed on a mold tool having a mold surface profile which is the inverse or negative of the required lens shape. To avoid the problem of under-filling a lens cavity defined between a lens-shaped recess in the surface profile of the mold tool and a flat surface of a substrate on which the lens is to be formed, an excess volume of epoxy is dispensed into the lens-shaped recess. During molding, the mold surface profile and the flat surface of the substrate are disposed towards one another with the dispensed epoxy in between so that the excess volume of epoxy overflows along the flat surface of the substrate beyond a periphery of the lens cavity. If the excess volume of epoxy is too great, this can lead to an excessive overflow which increases the footprint of each lens on the substrate and thereby effectively limits the density of lenses that may be manufactured on the substrate.

One known approach for controlling the overflow of epoxy is to define the mold surface profile so as to create not just a lens cavity for defining a profile of the lens with respect to an optical axis, but also a peripheral cavity between the mold surface profile and the flat surface of the substrate, wherein the peripheral cavity is located around a periphery of the lens cavity, and wherein the lens cavity and the peripheral cavity are connected by a narrow elongated region defined between the mold surface profile and the surface of the substrate. As a result of capillary action in the narrow elongated region, excess epoxy is gradually drawn radially outwardly out of the lens cavity relative to the optical axis through the narrow elongated region into the peripheral cavity where the excess epoxy accumulates to form a buffer or reservoir of epoxy in the peripheral cavity. As a consequence of the presence of the buffer or reservoir of epoxy in the peripheral cavity, the flow of excess epoxy radially outwardly from the lens cavity through the narrow elongated region into the peripheral cavity gradually reduces as the excess epoxy is removed from the lens cavity. Such an approach may avoid or reduce under-filling of the lens cavity, but may result in the formation of a peripheral region of residual epoxy around the functional area of the lens which may increase the overall footprint of the finished lens.

Another known approach for controlling the overflow of epoxy is to form a peripheral trench in the substrate surface around a target surface area of the substrate on which a lens is to be formed and to define the mold surface profile so that the lens cavity and the peripheral trench are connected by an epoxy flow path when a peripheral portion of the mold surface profile is brought into contact with a peripheral portion of the surface of the substrate around an outer periphery of the peripheral trench. As the mold tool is pressed towards the substrate, excess epoxy is forced out of the lens cavity and into the peripheral trench in the surface of the substrate via the epoxy flow path. However, such an approach may result in air in the peripheral trench being forced into the lens cavity as the mold surface profile and the substrate surface are pressed together resulting in the lens cavity being under-filled with epoxy. Although such an approach may limit the overall footprint of the finished lens component for a given lens functional area, such an approach may therefore lead to the lens cavity being under-filled with epoxy thereby increasing the probability that a lens will be defective or non-compliant with a desired lens profile specification.

SUMMARY

According to an aspect of the present disclosure there is provided a method for use in manufacturing an optical element, the method comprising:
    providing a substrate having a surface profile, the substrate surface profile defining one or more flow stop features for restraining a flow of viscous material over the substrate surface profile;
    providing a mold tool having a mold surface profile;
    dispensing viscous material onto the mold surface profile and/or onto the substrate surface profile;
    disposing the mold surface profile and the substrate surface profile towards one another; and
    aligning the mold surface profile and the substrate surface profile relative to one another,
    wherein the mold surface profile and the substrate surface profile are configured so that when the mold surface profile and the substrate surface profile are disposed towards one another and aligned relative to one another, the mold surface profile and the substrate surface profile define therebetween:
    an optical element cavity for defining a profile of the optical element with respect to an optical axis; and
    a peripheral cavity around a periphery of the optical element cavity, the peripheral cavity including the one or more flow stop features; and an air flow path for allowing air to flow out of the peripheral cavity to an environment external to the mold tool and the substrate, and for allowing air to flow into the peripheral cavity from the external environment, wherein the optical element cavity and the peripheral cavity define a peripheral constriction therebetween.

Such a method may reduce the radial extent of a peripheral region of residual epoxy around a functional area of the optical element compared to some prior art methods to thereby reduce the overall footprint of the finished optical element relative to some prior art finished optical elements. Specifically, as a result of capillary action during molding, an excess volume of viscous material may flow out of the optical element cavity radially outwardly past the peripheral constriction and into the peripheral cavity where the viscous material may flow not just in a radially outward direction, but also in a direction away from the substrate surface profile. In effect, this may help to reduce the radial extent of the peripheral region of residual epoxy around a functional area of the optical element compared to some prior art methods to thereby reduce the overall footprint of the finished optical element relative to some finished optical elements manufactured using prior art methods. Defining the peripheral cavity may also result in the method of manufacture of the lens element being more tolerant to variations in the excess volume of dispensed viscous material when compared to some prior art methods.

Such a method may also allow air to flow out of the peripheral cavity via the air-flow path to thereby avoid or reduce the likelihood of the optical element cavity being under-filled compared to some prior art methods and thereby reduce the probability that an optical element will be defective or non-compliant with a desired optical element specification.

Each of the one or more flow stop features may be separated from the peripheral constriction in a radially outward direction relative to the optical axis by a predetermined radial offset.

Such a radial offset between the peripheral constriction and the one or more flow stop features may result in the method being more tolerant to variations in the excess volume of dispensed viscous material when compared to some prior art methods.

The mold surface profile and the substrate surface profile may converge together with increasing radial distance from the optical axis until the peripheral constriction is reached. The mold surface profile and the substrate surface profile may diverge apart with increasing radial distance from the peripheral constriction.

The mold surface profile may be curved at the peripheral constriction. A tangent to the mold surface profile may be parallel to the substrate surface profile at the peripheral constriction. The mold surface profile may have a discontinuous gradient at the peripheral constriction. The peripheral constriction have a limited extent in the radial direction relative to the optical axis. For example, the peripheral constriction may have a radial dimension which is less than, or comparable to, a gap between the mold surface profile and the substrate surface profile which defines the peripheral constriction. In effect, this may help to reduce the radial extent of the peripheral region of residual epoxy around the functional area of the optical element compared to some prior art methods to thereby reduce the overall footprint of the finished optical element relative to some prior art finished optical elements.

The one or more flow stop features may be configured to control a shape of a meniscus of the viscous material so as help to restrain the flow of the viscous material in the peripheral cavity past the one or more flow stop features in the radially outward direction.

The one or more flow stop features may be configured to pin or anchor a meniscus of the viscous material to the one or more flow stop features so as help to restrain the flow of the viscous material in the peripheral cavity past the one or more flow stop features in the radially outward direction.

The method may comprise forming the one or more flow stop features of the substrate surface profile before dispensing the viscous material.

The substrate surface profile and the mold surface profile may define one or more alignment markers for use in aligning the substrate surface profile and the mold surface profile relative to one another.

Each flow stop feature may be defined, at least in part, by a discontinuity in a gradient of the substrate surface profile.

Each flow stop feature may extend along a straight line.

Each flow stop feature may extend along a curved path.

Each flow stop feature may extend along a circular path.

The substrate surface profile may define one or more peripheral recesses, each peripheral recess having a radially inner edge and a radially outer edge, wherein the radially inner edge of each peripheral recess is closer to the optical axis than the radially outer edge, and wherein each flow stop feature is defined, at least in part, by the radially inner edge of a corresponding peripheral recess of the substrate surface profile. Each of the one or more peripheral recesses of the substrate surface profile may act as a receptacle for viscous material in an over-flow scenario when the viscous material over-comes the restraining effect provided by the radially inner edge of the peripheral recess of the substrate surface profile and flows past the radially inner edge of the peripheral recess of the substrate surface profile in a radially outward direction and into the recess of the substrate surface profile.

Each peripheral recess of the substrate surface profile may extend along a straight line.

Each peripheral recess of the substrate surface profile may extend along a curved path.

Each peripheral recess of the substrate surface profile may extend along a circular path.

Each peripheral recess of the substrate surface profile may have a square, rectangular, curved or semi-circular cross-sectional profile.

The method may comprise removing material from one or more selected areas of a surface of the substrate to define the one or more peripheral recesses of the substrate surface profile.

The method may comprise using a dicing saw to the remove material from one or more selected areas of the substrate surface to define the one or more peripheral recesses of the substrate surface profile.

The method may comprise etching material from one or more selected areas of the substrate surface to define the one or more peripheral recesses of the substrate surface profile.

The method may comprise curing the viscous material, for example by exposing the viscous material to UV light and/or by heating the viscous material, so that the cured viscous material in the optical element cavity defines the optical element.

The viscous material may comprise an epoxy.

The mold surface profile and the substrate surface profile may be configured so that the optical element is cylindrically symmetric around the optical axis.

The mold surface profile and the substrate surface profile may be configured so that the optical element is cylindrically asymmetric around the optical axis.

The optical element may comprise a refractive optical element.

The optical element may be convex or concave in 2D.

The optical element may be convex or concave in 1D.

The optical element may comprise a lens element.

The optical element may be a cylindrical lens element.

The optical element may comprise a micro-optic element.

According to an aspect of the present disclosure there is provided a method for use in manufacturing a plurality of optical elements, the method comprising:

providing a substrate having a surface profile, the substrate surface profile defining a plurality of flow stop features for restraining a flow of viscous material over the substrate surface profile;

providing a mold tool having a mold surface profile;

dispensing viscous material onto the mold surface profile and/or onto the substrate surface profile;

disposing the mold surface profile and the substrate surface profile towards one another; and aligning the mold surface profile and the substrate surface profile relative to one another, wherein the mold surface profile and the substrate surface profile are configured so that when the mold surface profile and the substrate surface profile are disposed towards one another and aligned relative to one another, the mold surface profile and the substrate surface profile define therebetween:

a plurality of optical element cavities, each optical element cavity being configured to define a profile of a corresponding optical element with respect to a corresponding optical axis;

a plurality of peripheral cavities, each peripheral cavity being disposed around a periphery of a corresponding optical element cavity and each peripheral cavity including one or more corresponding flow stop features of the plurality of flow stop features; and one or more air flow paths for allowing air to flow out of each peripheral cavity to an environment external to the mold tool and the substrate, and for allowing air to flow into each peripheral cavity from the external environment, wherein each optical element cavity and the corresponding peripheral cavity define a corresponding peripheral constriction therebetween.

The method may comprise curing the viscous material, for example by exposing the viscous material to UV light and/or by heating the viscous material, so that the cured viscous material in each optical element cavity defines a corresponding optical element.

The method may comprise cutting, for example using a dicing saw, the substrate so as to separate the substrate into a plurality of optical element components, each optical element component comprising a corresponding optical element.

The viscous material may comprise an epoxy.

The mold surface profile and the substrate surface profile may be configured so that one or more of the optical elements is cylindrically symmetric around a corresponding optical axis.

The mold surface profile and the substrate surface profile may be configured so that one or more of the optical elements is cylindrically asymmetric around a corresponding optical axis.

One or more of the optical elements may comprise a refractive optical element.

One or more of the optical elements may be convex or concave in 2D.

One or more of the optical elements may be convex or concave in 1D.

One or more of the optical elements may comprise a lens element.

One or more of the optical elements may comprise a cylindrical lens element.

One or more of the optical elements may comprise a micro-optic element.

It should be understood that any one or more of the features of any one of the foregoing aspects of the present disclosure may be combined with any one or more of the features of any of the other foregoing aspects of the present disclosure.

BRIEF DESCRIPTION OF THE DRAWINGS

A method for use in manufacturing an optical element will now be described by way of non-limiting example only with reference to the accompanying drawings of which:

FIG. 1A is a schematic cross-section through a mold tool and a substrate when a mold surface profile of the mold tool and a substrate surface profile of the substrate are disposed towards one another and aligned relative to one another for the manufacture of a lens element;

FIG. 1B shows the expected epoxy meniscus profile on a flat substrate surface (standard meniscus) and the expected epoxy meniscus profile for the mold surface profile and substrate surface shown in FIG. 1A having a 0.15 mm wide, 0.05 mm deep recess formed in the substrate surface for different distances D between a radially inner edge of the recess and an optical axis of the lens;

FIG. 1O shows the expected epoxy distribution for the mold surface profile and substrate surface shown in FIG. 1A having a 0.15 mm wide, 0.05 mm deep recess formed in the substrate surface when the radially inner edge of the recess is located a distance of D=0.825 mm from the optical axis of the lens;

FIG. 1D shows the expected epoxy distribution for the mold surface profile and substrate surface shown in FIG. 1A having a 0.15 mm wide, 0.05 mm deep recess formed in the substrate surface when the radially inner edge of the recess is located a distance of D=0.75 mm from the optical axis of the lens;

DETAILED DESCRIPTION

Figure 2B:
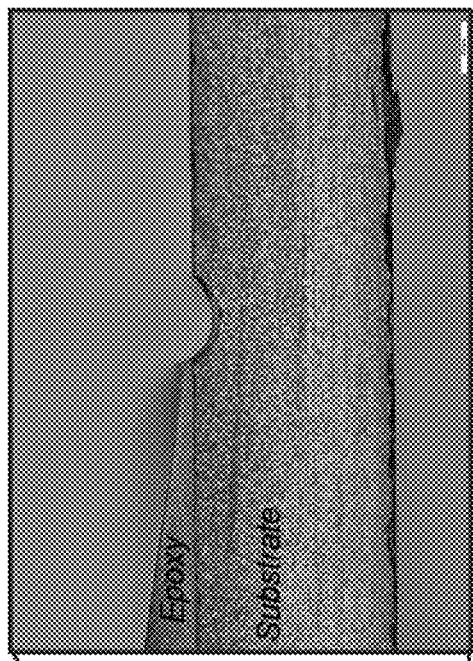
FIG. 2B is a cross-sectional image on YY of the lens element of FIG. 2A.

Referring initially to FIG. 1A, there is shown a mold tool 2 having a mold surface profile 4 and a substrate 6 having a substrate surface profile 8 for use in the manufacture of an optical element in the form of a lens element by molding a viscous material such as an epoxy. The mold surface profile 4 and the substrate surface profile 8 are configured so that when the mold surface profile 4 and the substrate surface profile 8 are disposed towards one another and aligned relative to one another as shown in FIG. 1A, the mold surface profile 4 and the substrate surface profile 8 define therebetween an optical element cavity 10 for defining a profile of the lens element with respect to an optical axis 12 and a peripheral cavity 14 disposed around a periphery 16 of the optical element cavity 10 such that the optical element cavity 10 and the peripheral cavity 14 define a peripheral constriction 18 therebetween. As will be described in more detail below, the presence of the peripheral cavity 14 may result in the method of manufacture of the lens element being more tolerant to variations in the excess volume of dispensed epoxy when compared to some prior art methods.

The mold surface profile 4 and the substrate surface profile 8 are further configured so that when the mold surface profile 4 and the substrate surface profile 8 are disposed towards one another and aligned relative to one another as shown in FIG. 1A, the mold surface profile 4 and the substrate surface profile 8 define therebetween one or more air flow paths 20 for allowing air to flow out of the peripheral cavity 14 to an environment 22 external to the mold tool 2 and the substrate 6, and for allowing air to flow into the peripheral cavity 14 from the external environment 22. As will be described in more detail below, the one or more air flow paths 20 allow air to flow out of the peripheral cavity 14 to the external environment 22 to thereby avoid or reduce the likelihood of the optical element cavity 10 being under-filled with epoxy compared to some prior art methods to thereby reduce the probability that the finished lens element will be defective or non-compliant with a desired optical element specification.

The mold surface profile 4 and the substrate surface profile 8 converge together with increasing radial distance from the optical axis 12 until the peripheral constriction 18 is reached. The mold surface profile 4 and the substrate surface profile 8 diverge apart with increasing radial distance from the peripheral constriction 18. The mold surface profile 4 is curved at the peripheral constriction 18. A tangent to the mold surface profile 4 is parallel to the substrate surface profile 8 at the peripheral constriction 18.

The substrate surface profile 8 defines a recess 30 which forms part of the peripheral cavity 14. The recess 30 has a radially inner edge 32 and a radially outer edge 34, wherein the radially inner edge 32 of the peripheral recess 30 is closer to the optical axis 12 than the radially outer edge 34. As will be described in more detail below, the radially inner edge 32 of the recess 30 serves as a flow stop feature for restraining a flow of epoxy over the substrate surface profile 8 during the molding process. As may be appreciated from FIG. 1A, the peripheral constriction 18 is located closer to the optical element cavity 10 than the radially inner edge 32 of the recess 30, with the radially inner edge 32 of the recess 30 being separated from the peripheral constriction 18 in a radially outward direction relative to the optical axis 12 by a predetermined radial offset that is selected based, at least in part, on the excess volume of epoxy to be used to form the lens element. As will be described in more detail below, such a radial separation between the peripheral constriction 14 and the radially inner edge 32 of the recess 30 may result in the method of manufacture of the lens element being more tolerant to variations in the excess volume of dispensed epoxy when compared to some prior art methods. In practice, the recess 30 is formed using a dicing saw prior to the molding process and the mold surface profile 4 and the substrate surface profile 8 include respective alignment marks to assist with the alignment of the mold surface profile 4 and the substrate surface profile 8.

The method for manufacturing a lens element begins with the step of dispensing a volume of epoxy (not shown in FIG. 1A) which exceeds a volume of the optical element cavity 10 onto the mold surface profile 4 in the vicinity of a recess in the mold surface profile 4 corresponding to the optical element cavity 10. The method continues with the mold surface profile 4 and the substrate surface profile 8 being disposed towards one another, aligned relative to one another, and brought towards one another gradually, or being allowed to approach one another gradually for example under the action of gravity, until the mold surface profile 4 and the substrate surface profile 8 are aligned as shown in FIG. 1A with the dispensed epoxy therebetween. As the mold surface profile 4 and the substrate surface profile 8 are bought towards one another, or are allowed to approach one another, the excess epoxy in the optical element cavity 10 is forced to conform to the mold surface profile 4 until the epoxy fills the optical element cavity 10 and extends radially outwardly relative to the optical axis 12 as far as the peripheral constriction 18. Capillary action then causes epoxy in the optical element cavity 10 to move radially outwardly relative to optical axis 12 through the peripheral constriction 18 and into the peripheral cavity 14, whereupon the epoxy continues to move not just radially outwardly relative to optical axis 12, but also upwardly away from the substrate surface profile 8 towards the mold surface profile 4. In effect, this may help to reduce the radial extent of a peripheral region of residual epoxy around a functional area of the optical element compared to some prior art methods to thereby reduce the overall footprint of the finished optical element relative to some finished optical elements manufactured using prior art methods. This may also result in the method of manufacture of the optical element being more tolerant to variations in the excess volume of dispensed epoxy when compared to some prior art methods.

Figure 2C:
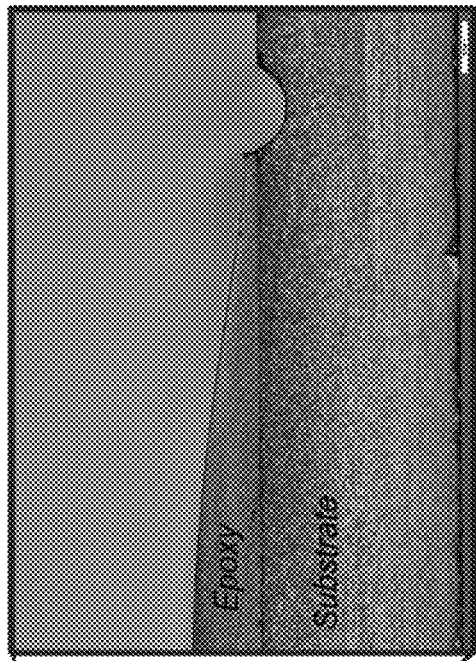
FIG. 2C is a cross-sectional image on XX of the lens element of FIG. 2A.
Figure 2A:
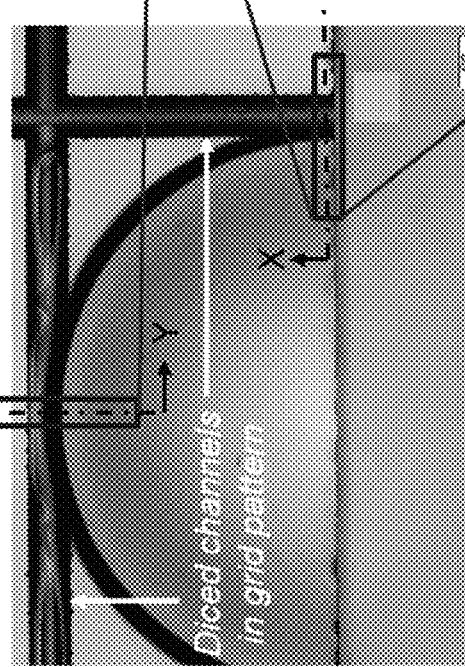
FIG. 2A is a plan view image of a lens element manufactured using a method according to the present disclosure.

Depending on the excess volume of the epoxy, the configuration of the peripheral cavity 14, and the predetermined distance from the peripheral constriction 18 to the radially inner edge 32 of the recess 30, the epoxy may continue to move radially outwardly relative to optical axis 12 and upwardly away from the substrate surface profile 8 towards the mold surface profile 4 until the epoxy encounters the radially inner edge 32 of the recess 30, whereupon further movement or flow of the epoxy in the radially outwardly direction is restrained by the radially inner edge 32 of the recess 30 which effectively serves to pin or anchor a meniscus of the epoxy to the radially inner edge 32 of the recess 30 leading to the simulated "edge stopper" epoxy meniscus profile 40 depicted in FIG. 1C. Once the epoxy meniscus profile has been formed, the epoxy is cured, for example using UV light and/or heat, and the mold tool 2 and the substrate 6 are separated leaving the finished lens element attached to the substrate 6. This may result in an actual or experimental "edge stopper" epoxy meniscus profile like that shown in FIG. 2C for the case of a substrate surface profile which includes a semi-circular recess.

It should be understood that, during the molding process, spacers (not shown) are located between the mold surface profile 4 and the substrate surface profile 8 at selected positions which are located remotely from the optical element cavity 10. The mold surface profile 4 and the substrate surface profile 8 approach one another until the spacers abut the mold surface profile 4 and the substrate surface profile 8.

The use of such spacers helps to control and define a minimum base layer thickness of the epoxy. From the foregoing description, one of ordinary skill in the art will also understand that once the process of bringing the mold tool 2 and the substrate 6 is started, air is pushed out by the epoxy through the peripheral cavity 14 and the one or more air flow paths 20 as a consequence of any external forces which act on the mold tool 2 and the substrate 6 and as a consequence of the capillary forces which act on the epoxy at the periphery of the optical element cavity 10. Consequently, at the end of the molding process, the optical element cavity 10 is filled with a base layer epoxy thickness defined by the spacers and the excess epoxy is accommodated in the peripheral cavity 14.

One of ordinary skill in the art will understand that, for a given configuration of the peripheral cavity 14 and a given excess volume of the epoxy, if the predetermined distance from the peripheral constriction 18 to the radially inner edge 32 of the recess 30 is too small, the radially inner edge 32 of the recess 30 may only temporarily restrain the flow of the excess epoxy and that the excess epoxy may later over-flow into the recess 30 leading to the simulated "over-flow" epoxy meniscus profile 42 depicted in FIG. 1D in which the recess 30 serves as a receptacle for some of the excess epoxy. Once the epoxy meniscus profile has been formed, the epoxy is cured, for example using UV light and/or heat, and the mold tool 2 and the substrate 6 are separated leaving the finished lens element attached to the substrate 6. This may result in an actual or experimental "over-flow" epoxy meniscus profile like that shown in FIG. 2B for the case of a substrate surface profile which includes a semi-circular recess.

Conversely, one of ordinary skill in the art will understand that, for a given configuration of the peripheral cavity 14 and a given predetermined distance from the peripheral constriction 18 to the radially inner edge 32 of the recess 30, if the excess volume of the epoxy is too great, the radially inner edge 32 of the recess 30 may only temporarily restrain the flow of the excess epoxy and that the excess epoxy may later over-flow into the recess 30 leading to the simulated "over-flow" epoxy meniscus profile depicted in FIG. 1D. This may result in an actual or experimental "over-flow" epoxy meniscus profile like that shown in FIG. 2B for the case of a substrate surface profile which includes a semi-circular recess. Consequently, the method of manufacture of the lens element may be more tolerant to variations in the excess volume of dispensed epoxy when compared to some prior art methods.

Figure 3B:
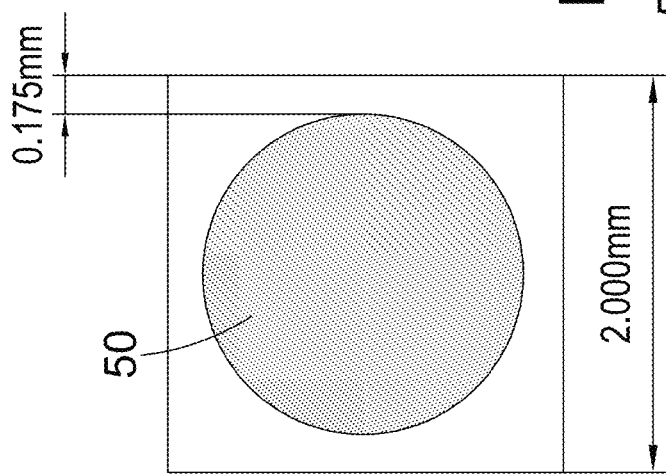
FIG. 3B is a schematic plan view of a lens element formed using an "edge stopper" epoxy meniscus profile.
Figure 3A:
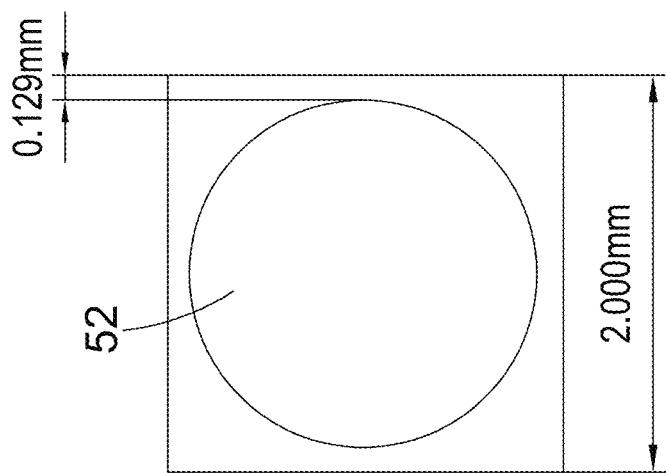
FIG. 3A is a schematic plan view of a lens element formed using a "standard" epoxy meniscus profile.
Figure 3C:
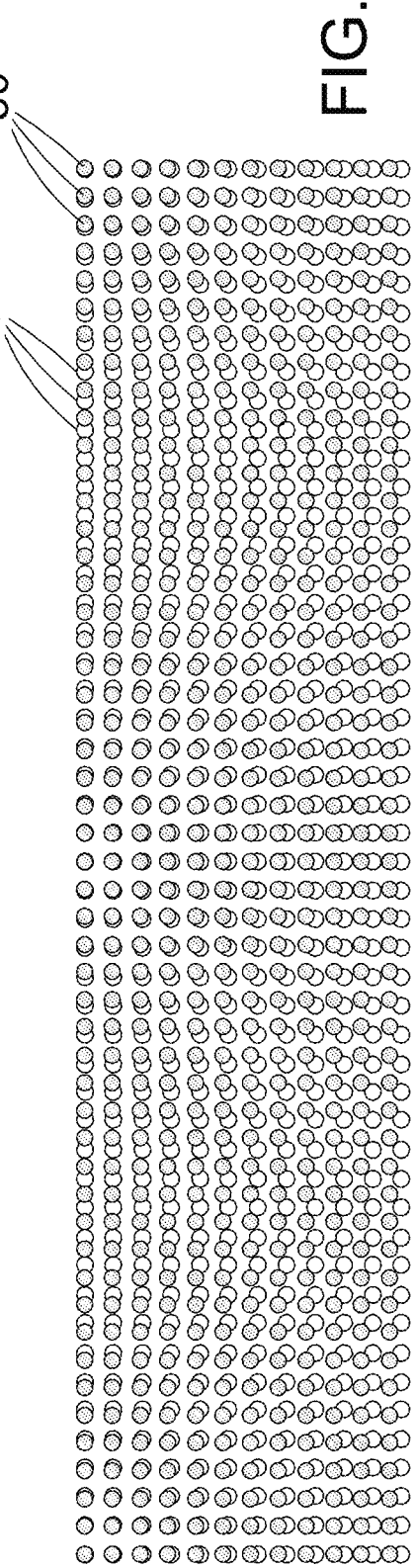
FIG. 3C is a schematic plan view of part of an array of lens elements formed using an "edge stopper" epoxy meniscus profile superimposed on an array of lens elements formed using a "standard" meniscus profile.

FIG. 1B shows the results of epoxy flow simulations showing the expected epoxy meniscus profile for the mold surface profile 4 and the substrate surface profile 8 shown in FIG. 1A having a 0.15 mm wide, 0.05 mm deep recess 30 located with the radially inner edge 32 of the recess 30 at different distances D from the optical axis 12 and the expected epoxy meniscus profile identified with the legend "standard meniscus" for the same mold surface profile 4 in conjunction with a flat substrate surface (not shown) i.e. without any recess formed in the substrate surface. The simulation results of FIG. 1B suggest that for the particular excess volume of the epoxy selected and for the particular surface profile 4 and the substrate surface profile 8 shown in FIG. 1A having a 0.15 mm wide, 0.05 mm deep recess 30, selecting D=0.825 mm results in the simulated "edge stopper" meniscus profile depicted in FIG. 10 wherein a radius of the epoxy footprint is approximately 0.825 mm and a finished lens element 50 having the epoxy footprint shown in FIG. 3B. This compares with a radius of the epoxy footprint of approximately 0.871 mm for the "standard" meniscus profile and a finished lens element 52 having the epoxy footprint shown in FIG. 3A i.e. the "edge stopper" meniscus profile results in a reduction in the overall radius of the epoxy footprint by 5.3% compared with the "standard" meniscus profile. In effect, this means that for a fixed clear distance between the edges of the epoxy of adjacent lens elements in an array of lens elements, the "edge stopper" meniscus profile may allow the pitch of the lens elements to be reduced or, equivalently, for the density of lens elements to be increased. For example, as shown in FIG. 3C this may allow an array of 51×51=2601 "edge stopper" meniscus profile lenses to be formed in a given wafer area compared with an array of 49×49=2401 "standard" meniscus profile lenses 52 in the same wafer area i.e. this may allow an increase in 8.3% in the number of lens elements for a given wafer area.

Although various embodiments of the disclosure have been described in terms as set forth above, it should be understood that these embodiments are illustrative only and that the claims are not limited to those embodiments. Those skilled in the art will understand that various modifications may be made to the described embodiments without departing from the scope of the appended claims. For example, the method may be used to manufacture an optical element of any kind. The method may be used to manufacture a refractive optical element of any kind. The mold surface profile 4 and the substrate surface profile 8 may be configured so that the optical element is cylindrically symmetric around the optical axis. The mold surface profile 4 and the substrate surface profile 8 may be configured so that the optical element is cylindrically asymmetric around the optical axis. The method may be used to manufacture an optical element which is convex or concave in 2D. The method may be used to manufacture an optical element which is convex or concave in 1D. The method may be used to manufacture a cylindrical lens element.

The recess 30 of the substrate surface profile 8 may have a square, rectangular, curved or semi-circular cross-sectional profile.

The recess 30 may be formed by etching.

Each flow stop feature may be defined, at least in part, by a discontinuity of any kind in a gradient of the substrate surface profile 8.

Each flow stop feature may extend along a straight line.
Each flow stop feature may extend along a curved path.
Each flow stop feature may extend along a circular path.
The mold surface profile 4 may have a discontinuous gradient at the peripheral constriction 18.

The epoxy may be dispensed onto the substrate surface profile 8 in addition to, or instead of, the mold surface profile 4.

Each feature disclosed or illustrated in the present specification may be incorporated in any embodiment, either alone, or in any appropriate combination with any other feature disclosed or illustrated herein. In particular, one of ordinary skill in the art will understand that one or more of the features of the embodiments of the present disclosure described above with reference to the drawings may produce effects or provide advantages when used in isolation from one or more of the other features of the embodiments of the present disclosure and that different combinations of the features are possible other than the specific combinations of the features of the embodiments of the present disclosure described above.

The skilled person will understand that in the preceding description and appended claims, positional terms such as 'above', 'along', 'side', etc. are made with reference to conceptual illustrations, such as those shown in the appended drawings. These terms are used for ease of reference but are not intended to be of limiting nature. These terms are therefore to be understood as referring to an object when in an orientation as shown in the accompanying drawings.

Use of the term "comprising" when used in relation to a feature of an embodiment of the present disclosure does not exclude other features or steps. Use of the term "a" or "an" when used in relation to a feature of an embodiment of the present disclosure does not exclude the possibility that the embodiment may include a plurality of such features.

The use of reference signs in the claims should not be construed as limiting the scope of the claims.

LIST OF REFERENCE NUMERALS 2 mold tool;
4 mold surface profile;
6 substrate;
8 substrate surface profile;
10 optical element cavity;
12 optical axis;
14 peripheral cavity;
16 periphery of the optical element cavity;
18 peripheral constriction;
20 air flow path;
22 external environment;
30 recess;
32 radially inner edge of recess;
34 radially outer edge of recess;
40 "edge stopper" epoxy meniscus profile;
42 "over-flow" epoxy meniscus profile;
50 finished lens element formed using "edge stopper" meniscus profile; and
52 finished lens element formed using "standard" meniscus profile.

The invention claimed is:

1. A method for use in manufacturing an optical element, the method comprising:
  providing a substrate having a surface profile, the substrate surface profile defining one or more flow stop features for restraining a flow of viscous material over the substrate surface profile;
  providing a mold tool having a mold surface profile;
  dispensing viscous material onto the mold surface profile and/or onto the substrate surface profile;
  disposing the mold surface profile and the substrate surface profile towards one another;
  aligning the mold surface profile and the substrate surface profile relative to one another;
  wherein the mold surface profile and the substrate surface profile are configured so that when the mold surface profile and the substrate surface profile are disposed towards one another and aligned relative to one another, the mold surface profile and the substrate surface profile define therebetween:
    an optical element cavity for defining a profile of the optical element with respect to an optical axis;
    a peripheral cavity disposed around a periphery of the optical element cavity, the peripheral cavity including the one or more flow stop features; and
    an air flow path for allowing air to flow out of the peripheral cavity to an environment external to the mold tool and the substrate and for allowing air to flow into the peripheral cavity from the external environment;
  wherein the optical element cavity and the peripheral cavity are separated by a peripheral constriction therebetween, the peripheral constriction defining an upwardly curved surface of the mold surface profile into the peripheral cavity for allowing formation of an epoxy meniscus profile.

2. The method as claimed in claim 1, wherein each of the one or more flow stop features is separated from the peripheral constriction in a radially outward direction relative to the optical axis by a predetermined radial offset.

3. The method as claimed in claim 1, wherein the mold surface profile and the substrate surface profile converge together with increasing radial distance from the optical axis until the peripheral constriction is reached, and the mold surface profile and the substrate surface profile diverge apart with increasing radial distance from the peripheral constriction.

4. The method as claimed in claim 1, wherein at least one of the following conditions is met:
  the mold surface profile is curved at the peripheral constriction;
  a tangent to the mold surface profile is parallel to the substrate surface profile at the peripheral constriction;
  the mold surface profile has a discontinuous gradient at the peripheral constriction;
  the peripheral constriction has a limited extent in a radial direction relative to the optical axis;
  the peripheral constriction has a radial dimension which is less than, or comparable to, a gap between the mold surface profile and the substrate surface profile which defines the peripheral constriction.

5. The method as claimed in claim 1, wherein at least one of the following conditions is met:
  the one or more flow stop features are configured to control a shape of a meniscus of the viscous material so as help to restrain the flow of the viscous material in the peripheral cavity past the one or more flow stop features in a radially outward direction;
  the one or more flow stop features are configured to pin or anchor a meniscus of the viscous material to the one or more flow stop features so as help to restrain the flow of the viscous material in the peripheral cavity past the one or more flow stop features in the radially outward direction.

6. The method as claimed in claim 1, wherein at least one of the following conditions is met:
  each flow stop features is defined, at least in part, by a discontinuity in a gradient of the substrate surface profile;
  each flow stop feature extends along a straight line;
  each flow stop feature extends along a curved path;
  each flow stop feature extends along a circular path.

7. The method as claimed in claim 1, wherein the substrate surface profile defines one or more peripheral recesses, each peripheral recess having a radially inner edge and a radially outer edge, wherein the radially inner edge of each peripheral recess is closer to the optical axis than the radially outer edge, and wherein each flow stop feature is defined, at least in part, by the radially inner edge of a corresponding peripheral recess of the substrate surface profile.

8. The method as claimed in claim 7, wherein each peripheral recess of the substrate surface profile has a square, rectangular, curved or semi-circular cross-sectional profile.

9. The method as claimed in claim 7, further comprising removing material from one or more selected areas of a surface of the substrate to define the one or more peripheral recesses of the substrate surface profile.

10. The method as claimed in claim 7, further comprising using a dicing saw to remove material from one or more selected areas of the substrate surface to define the one or more peripheral recesses of the substrate surface profile.

11. The method as claimed in claim 7, further comprising etching material from one or more selected areas of the substrate surface to define the one or more peripheral recesses of the substrate surface profile.

12. The method as claimed in claim 1, wherein the substrate surface profile and the mold surface profile define one or more alignment markers for use in aligning the substrate surface profile and the mold surface profile relative to one another.

13. The method as claimed in claim 1, further comprising curing the viscous material, by exposing the viscous material to UV light and/or by heating the viscous material, so that the cured viscous material in the optical element cavity defines the optical element.

14. The method as claimed in claim 1, wherein the viscous material comprises an epoxy.

15. The method as claimed in claim 1, wherein at least one of the following conditions is met:
 the mold surface profile and the substrate surface profile are configured so that the optical element is cylindrically symmetric around the optical axis;
 the mold surface profile and the substrate surface profile are configured so that the optical element is cylindrically asymmetric around the optical axis;
 the optical element comprises a refractive optical element;
 the optical element is convex or concave in 2D;
 the optical element is convex or concave in 1D;
 the optical element comprises a lens element;
 the optical element comprises a cylindrical lens element;
 the optical element comprises a micro-optic element.

16. A method for use in manufacturing a plurality of optical elements, the method comprising:
 providing a substrate having a surface profile, the substrate surface profile defining a plurality of flow stop features for restraining a flow of viscous material over the substrate surface profile;
 providing a mold tool having a mold surface profile;
 dispensing viscous material onto the mold surface profile and/or onto the substrate surface profile;
 disposing the mold surface profile and the substrate surface profile towards one another; and
 aligning the mold surface profile and the substrate surface profile relative to one another;
 wherein the mold surface profile and the substrate surface profile are configured so that when the mold surface profile and the substrate surface profile are disposed towards one another and aligned relative to one another, the mold surface profile and the substrate surface profile define therebetween:
  a plurality of optical element cavities, each optical element cavity being configured to define a profile of a corresponding optical element with respect to a corresponding optical axis;
  a plurality of peripheral cavities, each peripheral cavity being disposed around a periphery of a corresponding optical element cavity and each peripheral cavity including one or more corresponding flow stop features of the plurality of flow stop features; and
  one or more air flow paths for allowing air to flow out of each peripheral cavity to an environment external to the mold tool and the substrate, and for allowing air to flow into each peripheral cavity from the external environment;
  wherein each optical element cavity and the corresponding peripheral cavity are separated by a corresponding peripheral constriction therebetween, the peripheral constriction defining an upwardly curved surface of the mold surface profile into the peripheral cavity for allowing formation of an epoxy meniscus profile.

17. The method as claimed in claim 16, further comprising curing the viscous material so that the cured viscous material in each optical element cavity defines a corresponding optical element.

18. The method as claimed in claim 16, further comprising cutting the substrate so as to separate the substrate into a plurality of optical element components, each optical element component comprising a corresponding optical element.

19. The method as claimed in claim 16, wherein the viscous material comprises an epoxy.

20. The method as claimed in claim 16, wherein at least one of the following conditions is met:
 the mold surface profile and the substrate surface profile are configured so that one or more of the optical elements is cylindrically symmetric around a corresponding optical axis;
 the mold surface profile and the substrate surface profile are configured so that one or more of the optical elements is cylindrically asymmetric around a corresponding optical axis;
 one or more of the optical elements comprises a refractive optical element;
 one or more of the optical elements is convex or concave in 2D;
 one or more of the optical elements is convex or concave in 1D;
 one or more of the optical elements comprises a lens element;
 one or more of the optical elements comprises a cylindrical lens element;
 one or more of the optical elements comprises a micro-optic element.

* * * * *